US010024202B2

(12) United States Patent
Corbett et al.

(10) Patent No.: US 10,024,202 B2
(45) Date of Patent: Jul. 17, 2018

(54) CAM FOLLOWER ROLLER DEVICE WITH RETAINING PLUG

(71) Applicants: Richard Corbett, Fondettes (FR); Benoît Hauvespre, Saint Etienne de Chigny (FR); Samuel Viault, Saint-Antoine-du-Rocher (FR)

(72) Inventors: Richard Corbett, Fondettes (FR); Benoît Hauvespre, Saint Etienne de Chigny (FR); Samuel Viault, Saint-Antoine-du-Rocher (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/346,318

(22) Filed: Nov. 8, 2016

(65) Prior Publication Data

US 2017/0145869 A1 May 25, 2017

(30) Foreign Application Priority Data

Nov. 24, 2015 (EP) ..................................... 15306860

(51) Int. Cl.
*F01L 1/14* (2006.01)
*F16H 53/06* (2006.01)
*F02M 59/10* (2006.01)

(52) U.S. Cl.
CPC ............. *F01L 1/14* (2013.01); *F02M 59/102* (2013.01); *F16H 53/06* (2013.01); *F01L 2101/00* (2013.01); *F01L 2105/00* (2013.01); *F01L 2105/02* (2013.01); *F01L 2107/00* (2013.01)

(58) Field of Classification Search
CPC ..... F01L 1/14; F01L 2101/00; F01L 2105/00; F01L 2105/02; F01L 2107/00; F02M 59/102; F16H 53/06
See application file for complete search history.

(56) References Cited

U.S. PATENT DOCUMENTS

| 4,089,234 A * | 5/1978 | Henson ...................... F01L 1/14 123/90.5 |
| 4,747,376 A * | 5/1988 | Speil ....................... F01L 1/245 123/90.46 |
| 2007/0039575 A1 | 2/2007 | Sailer et al. |
| 2012/0080013 A1 | 4/2012 | Meier et al. |
| 2015/0082938 A1 * | 3/2015 | Schick ...................... F01L 1/14 74/569 |

FOREIGN PATENT DOCUMENTS

| DE | 102013209760 A1 | 11/2014 |
| EP | 0512698 A1 | 11/1992 |
| EP | 2853738 A1 | 4/2015 |
| WO | 2013119214 A1 | 8/2013 |

* cited by examiner

*Primary Examiner* — Thomas C Diaz
(74) *Attorney, Agent, or Firm* — Bryan Peckjian; SKF USA Inc. Patent Dept.

(57) ABSTRACT

The cam follower roller device provides a tappet body extending along an axis, an insert 18 mounted in the tappet body, a pin 14 mounted at least on the insert and a roller mounted on the pin. The device further provides a removable retaining plug carried by the tappet body and adapted to retain the insert relative to the body. A radial interference fit is provided between the retaining plug and the tappet body.

15 Claims, 2 Drawing Sheets

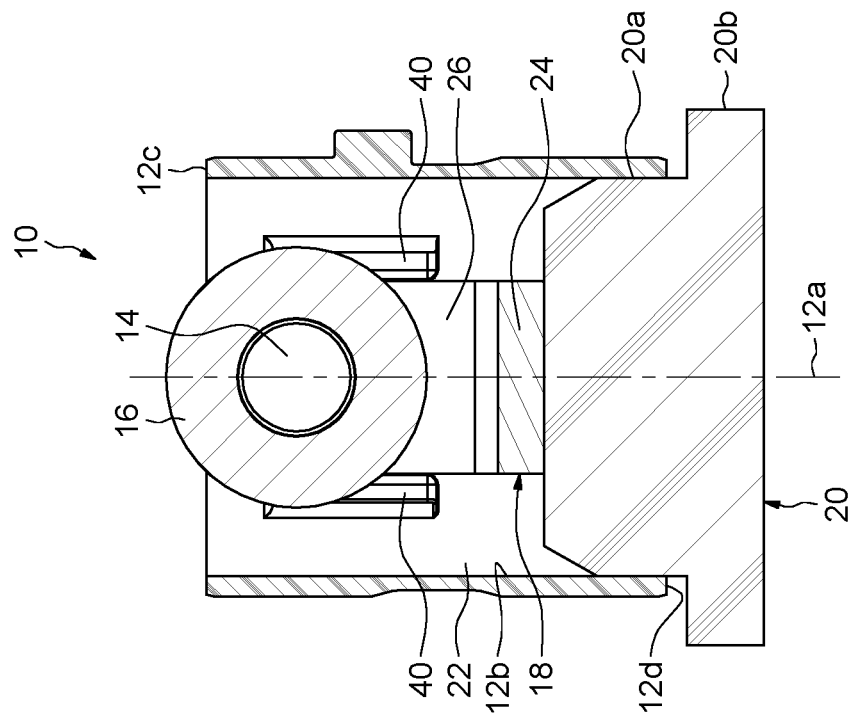
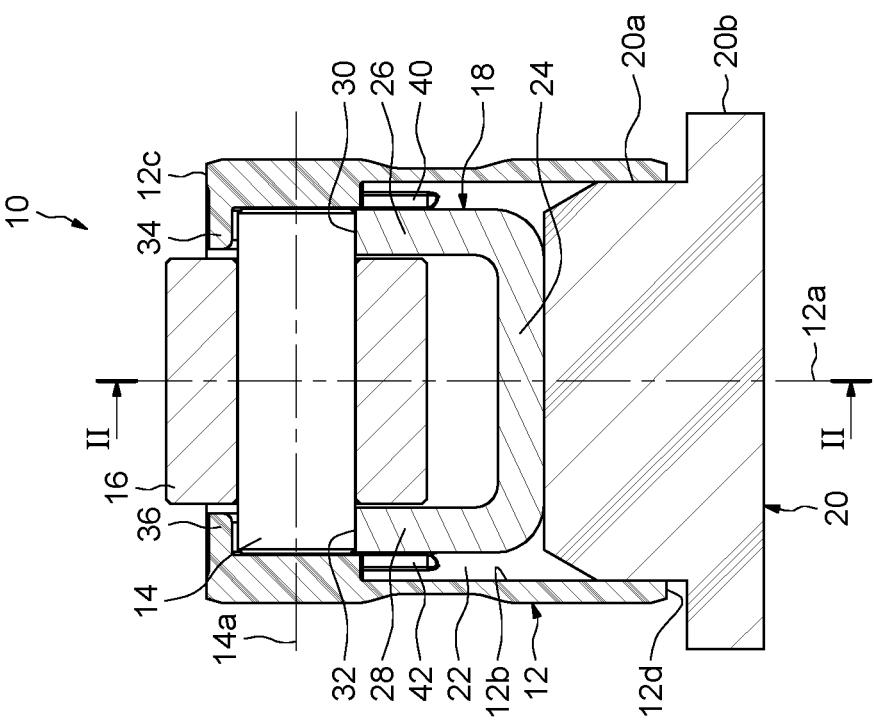

CAM FOLLOWER ROLLER DEVICE WITH RETAINING PLUG

CROSS REFERENCE TO RELATED APPLICATIONS

This application claims priority to European patent application no. 15306860.6 filed on Nov. 24, 2015, the contents of which are fully incorporated herein by reference.

FIELD OF THE INVENTION

The present invention relates to the field of cam follower roller devices used in automotive or industrial applications. One advantageous application of the invention is the use of the cam follower roller device in a fuel injection pump intended for an internal combustion engine, in particular of a motor vehicle. Another advantageous application of the invention is the use of the device in a rocker system intended for controlling valves of an internal combustion piston engine.

BACKGROUND OF THE INVENTION

Such a cam follower roller device generally provides an outer tappet body, a pin mounted on the tappet body and a roller movable in rotation relative to the pin around its axis. When the cam follower roller device is in service in a fuel injection pump, the roller collaborates with a cam synchronized with the internal combustion engine camshaft or crankshaft. The rotation of the camshaft, or crankshaft, leads to a periodic displacement of a piston of the pump that rests against the tappet body, to allow fuel to be delivered.

It is also known to provide the cam follower roller device with an insert as a stroke-transmission part mounted in the tappet body. EP-A1-2 853 738 describes a device comprising such an insert supporting the pin.

In order that the sub-assembly formed by the pin, the roller and the insert be held in place during storage and transport of the device, first and second local deformations are formed on the tappet body for fixing the insert to the body. The first and second deformations are respectively made by punching the tappet housing along a radial direction, and then along an axial direction.

BRIEF SUMMARY OF THE INVENTION

One aim of the present invention is to provide an improved cam follower roller device having a simplified assembly.

In one embodiment, the cam follower roller device provides a tappet body extending along an axis, an insert mounted in the tappet body, a pin mounted at least on the insert and a roller mounted on the pin. The device further provides a removable retaining plug carried by the tappet body and adapted to retain the insert relative to the body. A radial interference fit is provided between the retaining plug and the tappet body.

The cam follower roller device constitutes a unitary assembly that can be stored, handled, transported and delivered as a pre-assembled unit to a motor vehicle manufacturer or system supplier.

The retaining plug which is supported by the tappet body enables to retain the insert relative to the body. The retention of the insert may be obtained by contact between the insert and the retaining plug, preferably by axial contact.

The axial retention of the plug with respect to the tappet body is obtained by press-fitting. The interference fit between the plug and the tappet body defines the only axial retaining means to obtain the retention of the plug with respect to the tappet body.

The sub-assembly formed by the pin, the roller and the insert is held in place temporarily by the retaining plug. The plug holds the sub-assembly relative to the tappet body during storage and transport. The motor vehicle manufacturer or system supplier can remove the plug when installing the device in the engine or injection pump system. Afterwards the sub-assembly is held in place by the pump piston on one side and the cam on the other.

The retaining plug is press-fitted on or into the tappet body in such a way that the plug is still removable manually. As a matter of fact, the holding of the insert is only required before the mounting of the cam follower roller device in the engine or injection pump system. There is no need for permanent fixing means such as deformations formed on the tappet body, or glue or plastic welding. The cam follower roller device is therefore much simpler in design.

In one embodiment, the retaining plug is mounted into a bore of the tappet body, the radial interference fit being provided between the retaining plug and the bore. The retaining plug may be disposed axially on the side opposite to the pin and the roller with respect to the insert.

In another embodiment, the retaining plug may be mounted on an outer surface of the tappet body, the radial interference fit being provided between the retaining plug and the outer surface.

Preferably, the retaining plug provides a mounting portion fitted on or into the tappet body. Advantageously, the plug may further provide a grip portion disposed outside the tappet body. Accordingly, it is easier to allow the plug to be held and extracted outside of the device. The grip portion may radially extend the mounting portion.

In one embodiment, the mounting portion of the plug has a cylindrical form. The mounting portion may provide a plurality of ribs protruding radially, spaced apart with one another in the circumferential direction and coming into contact with the tappet body to obtain the radial interference fit.

Advantageously, the retaining plug is made in one part. The plug may be made from plastic material.

In one embodiment, the plug is mounted in axial contact with the insert. Alternatively, an axial gap may be provided between the plug and the insert.

In one embodiment, the insert provides a central core and at least two side tabs, the pin being mounted at least on the tabs. The retaining plug may be mounted in axial contact with the core of the insert. Preferably, each tab of the insert provides a receiving housing into which is mounted an end of the pin. The tappet body may provide axial blocking means for maintaining the pin into the receiving housings.

In one embodiment, the tappet body further provides anti-rotation means provided on the bore of the body and cooperating with the tabs of the insert to prevent the insert from moving in the circumferential direction. The anti-rotation means may provide two pairs of two axial ribs, each tab of the insert being located circumferentially between the two ribs of one pair.

BRIEF DESCRIPTION OF THE SEVERAL VIEWS OF THE DRAWING

The present invention and its advantages will be better understood by studying the detailed description of a specific embodiment given by way of non-limiting example and illustrated by the appended drawings on which:

FIG. 1 is a cross-section of a cam follower roller device according to an example of the invention, FIG. 2 is a section on II-II of FIG. 1.

DETAILED DESCRIPTION OF THE INVENTION

Figure 3:
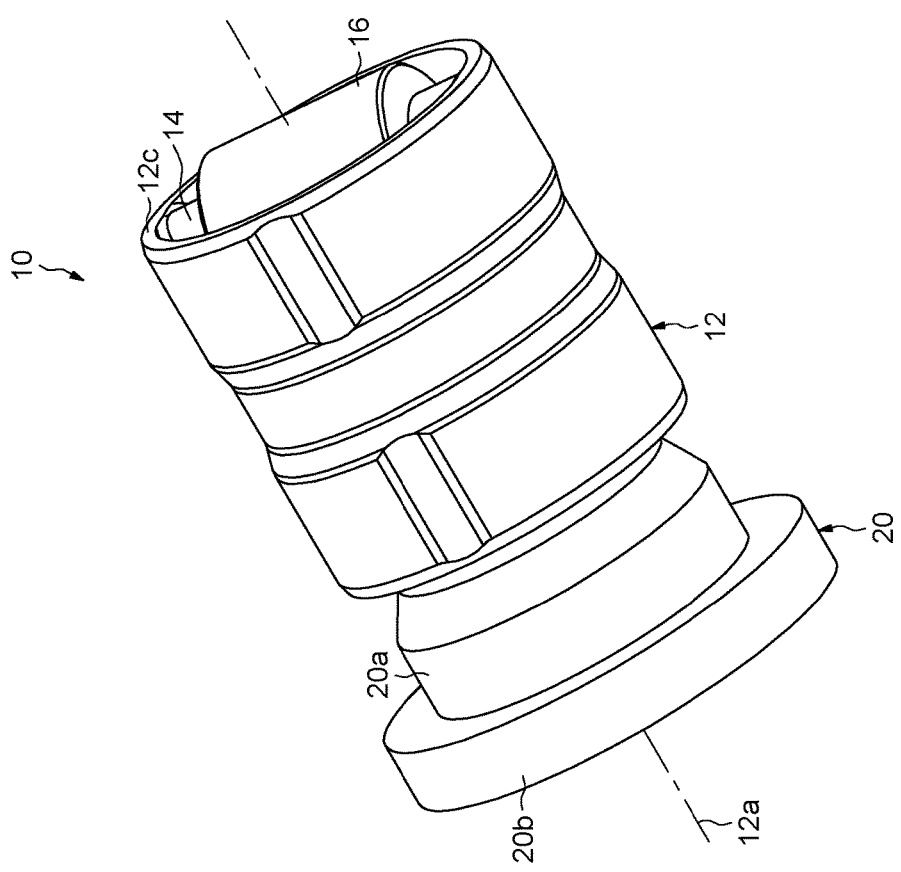
FIG. 3 is an exploded perspective view of the device of FIG. 1.

As shown on FIGS. 1 to 3, a cam follower roller device 10 provides an outer tappet housing or body 12 extending along an axis 12a, a shaft or pin 14 extending along an axis 14a perpendicular to the axis 12a, a roller 16 mounted on the pin and movable in rotation relative to the pin, and a stroke-transmission part or insert 18 mounted in the tappet body.

As will be described later, the device 10 further provides a removable retaining plug 20 to axially retain the insert 18 into the tappet body 12. The insert 18 supports the pin 14 while the plug 20 supports the insert.

In the disclosed embodiment, the roller 16 is directly mounted on the pin 14. Alternatively, a rolling bearing or a plain bearing may be radially interposed. The roller 16 provides a cylindrical outer surface (not referenced) which forms a contact surface intended to bear against the associated cam of the internal combustion engine.

The tappet body 12 is made in one part. In the disclosed example, the body 12 has a tubular form. The tappet body 12 provides a cylindrical axial outer surface and a cylindrical axial inner surface or bore 12b. The bore 12b delimits a cavity 22 inside which are located the insert 18 and the pin 14. The roller 16 axially protrudes outwards with respect to an upper face 12c of the tappet body 12. The tappet body 12 also provides a lower face 12d which delimits axially together with the upper face 12c the body. In the illustrated example, the tappet body 12 is made from synthetic material, such as polyamide for example. The tappet body 12 is advantageously formed by moulding. Alternatively, the tappet body 12 may be made of metal, for example in an economic way by cutting, stamping and folding.

The insert 18 is made in one part. The insert 18 may preferably be made of metal, by example steel, or be made of plastic material. The insert 18 is distinct from the tappet body 12. In the disclosed example, the insert 18 is entirely housed inside the cavity 22 delimited by the tappet body 12.

The insert 18 provides a base part or central core 24 and two side parts or lateral tabs 26, 28 extending from the core and facing each other. The tabs 26, 28 of the insert extend from the core 24 towards the upper face 12c of the tappet body. The insert 18 has in cross-section a U-shape. The roller 16 is disposed between the tabs 26, 28. A concave recess 30, 32 is provided at the free end of each tab to receive the pin 14. Both recesses 30, 32 extend through the tabs 26, 28 along the axis 14a and have the same diameter. Recesses 30, 32 form receiving housings adapted to receive the ends of the pin 14. Each end of the pin 14 is supported by one of the two tabs 26, 28. The pin 14 is supported by the insert 18.

The tappet body 12 further provides means 34, 36 for axially blocking the pin 14 and the roller 16 relative to the body. The axial blocking means 34, 36 block the translation of pin 14 in a direction from the lower face 12d of the tappet towards the upper face 12c. The axial blocking means 34, 36 are integrally formed with the tappet body 12. In the illustrated example, these means 34, 36 are provided on the bore 12b of the tappet body at the upper face 12c. The axial blocking means 34, 36 delimit receiving housings each facing one of the receiving housings 30, 32 of the insert to delimit together cylindrical bores for the ends of the pin 14. Alternatively, it could be possible to provide a spacer comprising cylindrical through-holes made into the thickness of the lateral tabs and facing one another, the ends of the pin 14 being fixed in the through-holes.

The tappet body 12 also provides two pairs of two axial ribs 40, 42 provided on the bore 12b of the body and which radially protrude inwards. The ribs 40, respectively 42, extend axially the axial blocking means 34, respectively 36. The ribs 40 are symmetrical to the ribs 42 with respect to a transverse axial plane passing through the centre of the roller 16. The ribs 40, 42 of each pair are spaced apart one relative to another to delimit a space into which is located one of the tabs 26, 28 of the insert. Accordingly, each tab 26, 28 is located circumferentially between the two ribs 40, 42 of one pair. Each tab 26, 28 abuts in the circumferential direction against one of the ribs 40, 42 of one pair on one side, and abuts against the other rib of the pair on the other side. The ribs 40, 42 cooperate with the tabs 26, 28 to prevent the insert 18 from moving in the circumferential direction relative to the tappet body 12.

The retaining plug 20 is distinct from the insert 18 and the tappet body 12. The plug 20 is made in one part. The plug 20 is made from synthetic material, such as polyamide, for example by moulding. Alternatively, the plug may be made of metal, for example in an economic way by cutting, stamping and folding.

The plug 20 extends along the axis 12a of the tappet body 12. The plug 20 is mounted into the bore 12b of the tappet body. The plug 20 is centred into the bore 12b. The plug 20 is mounted axially on the side opposite to the pin 14 and the roller 16 with respect to the insert 18. In the disclosed example, the plug 20 is mounted axially against the insert 18. The plug 20 is mounted in axial contact with the core 24 of the insert on the side opposite to the pin 14 and the roller 16. Alternatively, a slight axial gap may be provided between the plug 20 and the insert 18.

The plug 20 provides a cylindrical mounting portion 20a mounted into the bore 12b of the tappet body and a grip portion 20b disposed outside the body. The mounting portion 20a is fitted into the bore 12b of the tappet body. The mounting portion 20a is mounted in radial contact with the bore 12b. The mounting portion 20a is mounted in axial contact with the core 24 of the insert.

The grip portion 20b of the plug radially extends the mounting portion 20a axially on the side opposite to the insert 18. In the disclosed example, the grip portion 20b is axially offset with respect to the lower face 12d of the tappet body. In the disclosed example, the grip portion 20b has a cylindrical profile and forms a radial flange. Alternatively, the grip portion may have a different profile, for example a rectangular or a square one.

The plug 20 is press-fitted into the bore 12b of the tappet body. A radial interference fit is provided between the mounting portion 20a of the plug and the bore 12b. The interference fit between the plug 20 and the bore 12b is adapted such that the plug retains the insert 18 in place in the tappet body 12 while being not permanently secured to the body. The sub-assembly formed by the pin 14, the roller 16 and the insert 18 is held in place temporarily by the plug 20. The plug 20 holds the sub-assembly in tappet body 18 during storage and transport. Then, the plug 20 may be removed manually by an operator from the tappet body 12 when installing the device 10 in an internal combustion engine or injection pump system.

The invention has been illustrated on the basis of a cam follower roller device comprising a removable retaining plug press-fitted into the bore of the tappet body. Alternatively, the retaining plug may be mounted onto the outer surface of the tappet body rather than the inner bore with a radial interference fit between the mounting portion of the plug and the outer surface. This could be especially useful for a specific design of the device where the insert axially protrudes relative to the lower face of the tappet body.

In the disclosed example, the removable retaining plug comprises a cylindrical mounting portion. Alternatively, the mounting portion of the plug may have an annular form or may comprise a plurality of ribs protruding radially, spaced apart with one another in the circumferential direction and coming into contact with the bore of the tappet body, or its outer surface, to obtain the radial interference fit between the plug and the tappet body.

The invention claimed is:

1. A cam follower roller device comprising:
   a tappet body extending along an axis and having an upper face and a lower face, the tappet body having an inner tappet body surface defining a bore therein,
   an insert mounted in the bore of the tappet body, the insert having a central core extending planar perpendicular to the axis, the insert also having a first lateral tab extending axially from the central core in a direction parallel to the axis,
   wherein the tappet body further comprises a first pair of axial ribs which each protrude radially inwardly from the inner tappet body surface, the first pair of axial ribs are spaced apart from each other to define a first space therebetween, the tappet body and the insert being configured such that the first lateral tab is located in the first space between the first pair of axial ribs to prevent the insert from moving in the circumferential direction relative to the tappet body;
   a pin mounted at least on the insert, the upper face of the tappet extending radially inwardly over a portion of the pin and preventing translation of the pin along the axis past the upper face,
   a roller mounted on the pin, and
   a retaining plug removably supported by the tappet body and adapted to retain the insert within the tappet body, wherein
   wherein the retaining plug and the tappet body are configured such that a radial interference fit is provided between the retaining plug and the tappet body.

2. The device according to claim 1, wherein the retaining plug is mounted into the bore of the tappet body, and wherein the radial interference fit is provided between the retaining plug and the bore.

3. The device according to claim 1 wherein the insert further comprises a second lateral tab extending axially from the central core parallel to the axis, the tappet body further comprises a second pair of axial ribs which each protrude radially inwardly from the inner tappet body surface, the second pair of axial ribs are spaced apart from each other to define a second space therebetween, the tappet body and the insert being configured such that second lateral tab is located in the second space between the second pair of axial ribs to prevent the insert from moving in the circumferential direction relative to the tappet body.

4. The device according to claim 3, wherein the retaining plug is mounted in axial contact with the core of the insert.

5. The device according to claim 1, wherein the retaining plug comprises a mounting portion fitted into the tappet body.

6. The device according to claim 5, wherein the mounting portion has a cylindrical form.

7. The device according to claim 1, wherein the retaining plug comprises a grip portion disposed outside the tappet body.

8. The device according to claim 7, wherein the retaining plug is mounted in axial contact with the insert.

9. The device according to claim 7, wherein the retaining plug comprises a mounting portion fitted into the tappet body, and wherein the grip portion radially extends from the mounting portion.

10. The device according to claim 1, wherein the retaining plug comprises a mounting portion and a grip portion, the mounting portion being fitted into the tappet body, the grip portion being axially spaced from the lower face of the tappet body and extending radially outwardly past an outer surface of the tappet body.

11. The device according to claim 10, wherein the retaining plug is mounted in axial contact with the insert.

12. The device according to claim 11, wherein the first lateral tab and a second lateral tab of the insert each comprises a receiving housing into which is mounted an end of the pin.

13. The device according to claim 1, wherein the retaining plug is made in one part.

14. The device according to claim 1, wherein the retaining plug is made from plastic material.

15. The device according to claim 1, wherein the retaining plug is mounted in axial contact with the insert.

* * * * *